United States Patent
De Flon

(10) Patent No.: US 11,085,106 B2
(45) Date of Patent: Aug. 10, 2021

(54) THREE DIMENSIONAL PRINTING OF CERMET OR CEMENTED CARBIDE

(71) Applicant: SANDVIK INTELLECTUAL PROPERTY AB, Sandviken (SE)

(72) Inventor: John De Flon, Saltsjo-Duvnas (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 221 days.

(21) Appl. No.: 16/093,554

(22) PCT Filed: Nov. 30, 2016

(86) PCT No.: PCT/EP2016/079339
§ 371 (c)(1),
(2) Date: Oct. 12, 2018

(87) PCT Pub. No.: WO2017/178084
PCT Pub. Date: Oct. 19, 2017

(65) Prior Publication Data
US 2019/0211424 A1    Jul. 11, 2019

(30) Foreign Application Priority Data
Apr. 15, 2016 (EP) .................................... 16165640

(51) Int. Cl.
*B22F 3/10* (2006.01)
*C22C 29/06* (2006.01)
(Continued)

(52) U.S. Cl.
CPC ............ *C22C 29/06* (2013.01); *B22F 1/0011* (2013.01); *B22F 1/0059* (2013.01);
(Continued)

(58) Field of Classification Search
None
See application file for complete search history.

(56) References Cited

U.S. PATENT DOCUMENTS

2010/0047622 A1*  2/2010  Fischer .................... C23C 4/06
                                                         428/698
2012/0151846 A1   6/2012  Wan
                          (Continued)

FOREIGN PATENT DOCUMENTS

CN         102534337 A      7/2012
EP         0864661 A1       9/1998
                (Continued)

OTHER PUBLICATIONS

Kernan et al. "Three dimensional printing of tungsten carbide-10 wt% cobalt using cobalt oxide precursor", International Journal of Refractory Metals and Hard Materials, vol. 25, pp. 82-94, 2007.
(Continued)

*Primary Examiner* — George Wyszomierski
(74) *Attorney, Agent, or Firm* — Corinne R. Gorski

(57) ABSTRACT

The present invention relates to a powder for three-dimensional printing of a cermet or a cemented carbide body. The powder has 30-70 vol % of the particles that are <10 μm in diameter. The present invention also relates to a method of making a cermet or cemented carbide body. The method includes the steps of forming the powder, 3D printing a body using the powder together with a printing binder to form a 3D printed cermet or cemented carbide green body and subsequently sintering the green body to form a cermet or cemented carbide body.

7 Claims, 3 Drawing Sheets

(51) Int. Cl.
*C22C 1/05* (2006.01)
*B22F 10/10* (2021.01)
*B33Y 10/00* (2015.01)
*B33Y 70/00* (2020.01)
*B22F 1/00* (2006.01)
*B22F 3/15* (2006.01)
*B23B 27/14* (2006.01)
*B23C 5/16* (2006.01)
*B24D 3/00* (2006.01)
*E21C 35/183* (2006.01)
*E21B 10/46* (2006.01)
*B33Y 80/00* (2015.01)
*B22F 5/00* (2006.01)

(52) U.S. Cl.
CPC .............. *B22F 3/1021* (2013.01); *B22F 3/15* (2013.01); *B22F 10/10* (2021.01); *B23B 27/148* (2013.01); *B23C 5/16* (2013.01); *B24D 3/008* (2013.01); *B33Y 10/00* (2014.12); *B33Y 70/00* (2014.12); *C22C 1/051* (2013.01); *B22F 2005/001* (2013.01); *B22F 2207/03* (2013.01); *B22F 2301/15* (2013.01); *B22F 2302/10* (2013.01); *B22F 2304/10* (2013.01); *B23B 2222/16* (2013.01); *B23C 2222/16* (2013.01); *B33Y 80/00* (2014.12); *E21B 10/46* (2013.01); *E21C 35/183* (2013.01); *E21C 35/1835* (2020.05)

(56) References Cited

U.S. PATENT DOCUMENTS

| | | | | |
|---|---|---|---|---|
| 2012/0156083 | A1* | 6/2012 | Martensson | ............ C22C 29/10 419/15 |
| 2015/0096467 | A1* | 4/2015 | Trivedi | ................ C09D 191/06 106/270 |
| 2016/0375493 | A1* | 12/2016 | Stoyanov | ................ C22C 29/08 419/6 |

FOREIGN PATENT DOCUMENTS

| | | |
|---|---|---|
| EP | 2465960 A1 | 6/2012 |
| EP | 2690196 A1 | 1/2014 |
| JP | H05179310 A | 7/1993 |
| JP | 2002356328 A | 12/2002 |
| WO | 2010126424 A | 4/2010 |
| WO | 2015073081 A1 | 5/2015 |
| WO | 2015162206 A2 | 10/2015 |

OTHER PUBLICATIONS

Hashe et al. "Characterization of WC-(W,V)C—Co made from pre-alloyed (W,V) C", International Journal of Refractory Metals and Hard Materials, Elsevier, Amsterdam,NL. vol. 27, No. 2, Mar. 1, 2009, pp. 229-233.

* cited by examiner

THREE DIMENSIONAL PRINTING OF CERMET OR CEMENTED CARBIDE

RELATED APPLICATION DATA

This application is a § 371 National Stage Application of PCT International Application No. PCT/EP2017/079339 filed Nov. 30, 2016 claiming priority to EP 16165640.0 filed Apr. 15, 2016.

TECHNICAL FIELD

The present invention relates to a method of three dimensional printing of a cermet or cemented carbide body. The present invention also relates to a powder to be used in three dimensional printing. The powder comprises cermet and/or cemented carbide powder wherein 30-70 vol % of the powder particles are <10 μm in diameter and wherein the particles with a diameter of >20 μm are porous.

BACKGROUND ART

Three dimensional (3D) printing or additive manufacturing is a promising manufacturing technique that makes it possible to print a three dimensional body. A model of the body is typically created in a computer program and this model is then printed in a three dimensional printing machine or apparatus. Three dimensional printing is a promising manufacturing technique because it makes it possible to produce complex structures and bodies that cannot be achieved via conventional manufacturing processes.

One type of three dimensional printing is based on binder jetting wherein an ink jet type printer head is used to spray binder onto a thin layer of powder, which, when set, forms a sheet of glued together powder for a given layer of an object. After the binder is set, a next thin layer of powder is spread over the original layer, and the printed jetting of binder is repeated in the pattern for that layer. The powder that was not printed with the binder remains where it was originally deposited and serves as a foundation and as support for the printed structure. When printing of the object is complete, the binder is cured at an increased temperature and subsequently the powder not printed with binder is removed by for example an air stream or brushing.

Cermet and cemented carbide materials consist of hard constituents of carbides and/or nitrides such as WC or TiC in a metallic binder phase of for example Co. These materials are useful in high demanding applications due to their high hardness and high wear resistance in combination with a high toughness. Examples of areas of application are cutting tools for metal cutting, drill bits for rock drilling and wear parts.

There is a need to find a successful method of three dimensional printing of cermet and cemented carbide bodies. One of the challenges is that the final product needs to be homogeneous in structure and in composition. Another is that the density of pores needs to be very limited.

"Three dimensional printing of tungsten carbide-10 wt% cobalt using cobalt oxide precursor" by Kernan et al, International Journal of Refractory Metals and Hard Materials 25 (2007), p. 82-94, discloses a slurry-based three dimensional printing of cemented carbide insert using cobalt oxide that is reduced into cobalt metal during a sintering step.

SUMMARY OF THE INVENTION

It is an objective of the present invention to provide a powder that is suitable to use in three dimensional printing of cermet or cemented carbide bodies.

It is a further object of the present invention to provide a method of making a three dimensional (3D) printed cermet or cemented carbide body with a homogeneous composition and with a minimum of pores.

It is also an object of the present invention to provide a 3D printed body with a minimum of pores.

The present invention relates to a powder for three dimensional printing of a cermet or cemented carbide body, wherein said powder comprises cemented carbide and/or cermet particles with a D90 of 15-35 μm, preferably 17-30 μm, and wherein the average porosity of the cermet and/or cemented carbide particles with a diameter of 20 μm is 10-40 vol %, preferably 15-30 vol %, more preferably 20-25 vol %, and wherein 30-70 vol % or 30-65 vol %, preferably 40-65 or 45-65 vol %, of the particles are <10 μm in diameter.

The powder of the present invention has shown advantages in that three dimensional bodies of cermet or cemented carbide can be printed successfully with satisfying properties relating to porosity and/or metallic binder phase enriched zones. It has been found that the combination of sufficient particle porosity and an adapted particle size distribution is important for the final density and homogeneity of the cermet or cemented carbide body.

An average porosity in the larger particles of 10-40 vol %, or 15-30 vol %, or 17-30 vol % or 15-25 vol % is advantageous in adding sintering activity to the three dimensional printed green body. The porosity in particles contributes to the sintering activity during the sintering of the printed green body. If the porosity of the particles is too low the sintering activity in the green body during sintering will be reduced and residual porosity and/or open porosity might appear after the sintering step. The porosity is preferably adjusted based on the binder phase content. A lower binder phase content generally requires a higher porosity of the cermet or cemented carbide particles to provide sufficient sintering activity. The porosity can for example be measured in a LOM at 1000× magnification.

If the porosity of the particles is too high the green body will be relatively fragile. The reason to causing the green body to be fragile is probably that capillary forces cause a sucking up of printing binder into the porous particles, leaving less printing binder at the surface of each porous particle and thereby causing a weaker connection between particles.

Furthermore it has been found that the green strength of the printed green body can be increased to a sufficient level if the powder comprises particles of a selected particle distribution. If the powder comprises more than 70 vol % particles with a diameter<10 μm, the flow of the powder during printing will be uneven and demanding. If the amount of these <10 μm particles is lower than 30 wt % the green strength of the printed green body will be insufficient. Fine particles also contribute in sintering activity and thereby contribute to reduced residual porosity. The fine<10 μm particles contribute with an increased printing binder (glue) locking of the powder during the printing so that the green strength become sufficient.

The cemented carbide and/or cermet particles of the powder of the present invention comprise a relatively high fraction of fine particles. These fine particles are milled to its fine size and the milling also implies that the fine particles are irregular in shape, i.e. they are typically not spherical. An advantage with these particles is that the powder bed formed during printing is stable.

The three dimensional printing of a cermet or cemented carbide body may result in a body of any shape suitable for its purpose. Cermet and the cemented carbide both comprise hard constituents in a metallic binder phase. In the case of cemented carbide, at least a portion of the hard constituents consists of WC. The number and size of pores in the three dimensional printed and sintered cermet or cemented carbide body is preferably lower than A06 and/or B06 as defined in ISO4505-1978, preferably lower than A04 and/or B04 more preferably lower than A02 and/or B02. The number and size of pores in the three dimensional printed and sintered cermet or cemented carbide body is preferably lower than A02B00C00, A00B02C00 or A02B02C00. Most preferably no pores are present in the three dimensional printed and sintered cermet or cemented carbide body.

The D90 of the porous particles is 15-35 μm, preferably 17-30 μm. This is advantageous in that it provides a powder with good flow during printing and decreased risk for problems related to metallic binder phase enriched zones. Too large porous particles tend to contribute in the formation of metallic binder phase enriched zones in the sintered cermet or cemented carbide body. The sintered cermet or cemented carbide body ideally consists of a material composed of hard constituents such as WC in a metallic binder phase such as Co, wherein the metallic binder phase is evenly or homogeneously distributed inside the body and wherein any metallic binder phase enriched zones homogeneously or evenly distributed.

In one embodiment of the present invention the D50 of the cemented carbide and/or cermet particles is 5-20 μm, preferably 7-15 μm, more preferably 9-13 μm.

In one embodiment of the present invention the D10 of the cemented carbide and/or cermet particles is 1-5 μm.

In one embodiment of the present invention the particle size distribution of the cemented carbide and/or cermet particles in the powder is unimodal. This is advantageous in that the powder can be milled to reach a preferred particle size distribution.

In one embodiment of the present invention the cermet and/or cemented carbide particles comprise a metallic binder phase and wherein the average content of metallic binder phase in the powder is 8-14 wt %, preferably 9-13 wt % or 10-13 wt %. The metallic binder phase content is herein calculated excluding the organic binder, based on only hard constituents and metallic binder content in powder. A metallic binder phase content within this range is advantageous in that the density of pores in the sintered cermet or cemented carbide body may be very limited and still the body can gain from the hardness and toughness that is characteristic for a cermet or cemented carbide body. It is usually easier to produce a pore free body with a higher content of metallic binder phase since it is this phase that is melting during liquid phase sintering. The cermet or cemented carbide also typically comprises hard constituents. These hard constituents are ceramic and can for example be TiN, TiCN, TiC and/or WC in any combination.

In one embodiment the metallic binder phase content is 8-11 wt % and 50-70 vol % of the cermet or cemented carbide particles are <10 μm in diameter.

In one embodiment the metallic binder phase content is 11-14 wt % and 35-50 vol % of the cermet or cemented carbide particles are <10 μm in diameter.

In one embodiment of the present invention the cermet and/or cemented carbide particles comprise a metallic binder phase and said metallic binder phase comprises Co. In one embodiment of the present invention the metallic binder phase comprises more than 90 wt % Co. In one embodiment of the present invention the metallic binder phase consists of Co.

In one embodiment of the present invention the cemented carbide particles comprises WC and wherein the average WC grain size is 0.5-5 μm or 0.5-2 μm. Preferably more than 90 wt % of the hard constituents are WC.

The present invention also relates to a method of making a 3D printed cermet or cemented carbide body, said method comprising the steps of:
 mixing a cermet or cemented carbide raw powder with organic binder, such as PEG,
 spray drying said raw powder and thereby form a granulated raw powder
 pre-sintering said spray dried raw powder removing the organic binder and thereby form a pre-sintered granulated powder with an average porosity of the cermet and/or cemented carbide particles with a diameter of 20 μm is 10-40 vol %, preferably 15-30 vol %, more preferably 20-25 vol %,
 milling said pre-sintered granulated powder until 20-70 vol %, preferably 45-65 vol %, of the particles are <10 μm in diameter and thereby form a powder
 3D printing a body using said powder together with a printing binder and thereby form a 3D printed cermet or cemented carbide green body,
 sintering said green body and thereby form a 3D printed cermet or cemented carbide body.

In one embodiment of the present invention the method further comprise, subsequent to 3D printing and before sintering, the steps of:
 curing the 3D printed body in inert atmosphere at 150-230° C., and
 depowdering the 3D printed body to remove loose particles from the surfaces of the body.

Curing is normally performed as a part of the printing step. The printing binder is cured whereby the green body gets a sufficient green strength. The curing can be performed by subjecting the printed green body to an increased temperature, such as 150-250° C. before removal of the excessive powder. In one embodiment the curing is performed in a non-oxidation environment such as in Ar or $N_2$.

In one embodiment of the present invention the sintering step comprises a debinding step, where the printing binder is burned off. The printing binder comprises a solvent that partly evaporates during the printing. The printing binder can be water-based.

In one embodiment of the present invention the spray dried powder is sieved before the pre-sintering step, preferably sieved to remove particles larger than 42 μm in diameter.

This is advantageous in that it reduces the risk of problems with very large particles in the powder.

In one embodiment the three dimensional printing is performed in a three dimensional printing machine such as a binder jet three dimensional printing machine.

In one embodiment the sintering is performed in a sintering furnace.

In one embodiment of the present invention the method further comprise a step of, subsequent to or integrated into the sintering step, a step of so called sinter-HIP or GPS (gas pressure sintering) the cermet or cemented carbide body. The sinter-HIP may be performed at a temperature of 1300-1500° C. The sinter-HIP may be performed at a pressure of 20-100 bar. Subsequent to for example a normal vacuum sintering, a pressure is applied. The aim of the sinter-HIP step is to reduce any porosity left after the sintering by densifying the material. Any closed porosity in the sintered body is encapsulated and the applied pressure will reduce the porosity. Open porosity can on the other hand not be reduced using sinter-HIP.

In one embodiment of the present invention the three dimensional printing is a binder jetting. Binder jetting is advantageous in that it is a relatively cheap three dimensional printing method.

A step of grinding or polishing the body can be added as a final step after the sintering step.

In one embodiment of the present invention the 3D printed body is a cutting tool for metal cutting or a cutting tool for mining application or a wear part.

The present invention also relates to the use of said powder in three dimensional printing of a cutting tool for metallic cutting such as an insert, a drill or an end mill, or a cutting tool for mining application such as a drill bit, or a wear part.

The present invention also relates to a 3D printed cermet or cemented carbide body with a microstructure of the classification A00B00C00.

In one embodiment the 3D printed cermet or cemented carbide body is composed of hard constituents in a binder phase wherein the binder phase content is varying in the body such that a binder phase content measurement in a direction perpendicular from at least one surface of the body towards the center of the body shows a binder phase content variation being periodically with a period P, wherein the period P is 40-140 µm. The periodicity typically originates from the layered printing process.

In one embodiment of the present invention the average binder phase content shows, as an average of 15 adjacent periods, a difference of 10-20% from the average binder phase content in the body.

In one embodiment the average binder phase content shows, as an average of 15 adjacent periods, a difference of 10-50% from the average binder phase content in the body.

In one embodiment the average metallic binder phase content in the body is 8-14 wt %. In one embodiment the metallic binder phase comprises Co. In one embodiment the hard constituents comprises WC, preferably with an average WC grain size of 0.5-5 µm.

In one embodiment the body is a cutting tool for metal cutting or a wear part.

The metallic binder phase content variation can for example be measured by WDS (Wavelength-dispersive X-ray spectroscopy) or EDS (Energy-dispersive X-ray spectroscopy). Since the cermet or cemented carbide body is a composite comprising a metallic binder phase and hard constituents the binder phase content has to be measured as an average. The area needed to give a value of the binder phase content is to be selected by the skilled person but can for example be a scan width of 200 µm.

The periodic variation of metallic binder phase content originates in the layer by layer deposition of the powder during printing of the green body. It has been found that a period of 40-140 µm is suitable to achieve a dense and pore free cermet or cemented carbide with hard and wear resistant properties.

Still other objects and features of the present invention will become apparent from the following detailed description considered in conjunction with the accompanying drawings.

DEFINITIONS

The term "cermet" is herein intended to denote a material comprising hard constituents in a metallic binder phase, wherein the hard constituents comprise carbides or carbonitrides of one or more of Ta, Ti, Nb, Cr, Hf, V, Mo and Zr, such as TiN, TiC and/or TiCN.

The term "cemented carbide" is herein intended to denote a material comprising hard constituents in a metallic binder phase, wherein the hard constituents comprise WC grains. The hard constituents can also comprise carbides or carbonitrides of one or more of Ta, Ti, Nb, Cr, Hf, V, Mo and Zr, such as TiN, TiC and/or TiCN.

The metallic binder phase in the cermet or in the cemented carbide is a metal or a metallic alloy, and the metal can for example be selected from Cr, Mo, Fe, Co or Ni alone or in any combination. Preferably the metallic binder phase comprises a combination of Co, Ni and Fe, a combination of Co and Ni, or only Co. The metallic binder phase can comprise other suitable metals as known to the skilled person.

The particle sizes distribution is herein presented by D10, D50 and D90 values. The D50, the median, is defined as the particle diameter where half of the population has a size smaller than this value. Similarly, 90 percent of the distribution is smaller than the D90 value, and 10 percent of the population is smaller than the D10 value.

EXAMPLES

Embodiments of the present invention will be disclosed in more detail in connection with the following examples. The examples are to be considered as illustrative and not limiting embodiments.

Powders of Co, Cr and WC were mixed to form a cemented carbide raw powder. Also PEG was added to this raw powder.

As a next step spray drying of said raw powder was performed forming spherical granules of WC, Co, Cr and PEG. The powder of spray dried granules was sieved to remove granules larger than 42 µm in diameter.

Figure 3:
FIG. 3. The cake of pre-sintered powder was breakable by hand.

The spray dried granules were then pre-sintered to remove the PEG but keep a residual porosity in the pre-sintered granules. The pre-sintering was performed at 1230° C. for 1 hour. The pre-sintering resulted in a fragile cake of pre-sintered granules, i.e. of porous cemented carbide particles. The cake was breakable by hand, see FIG. 3.

Figure 4:
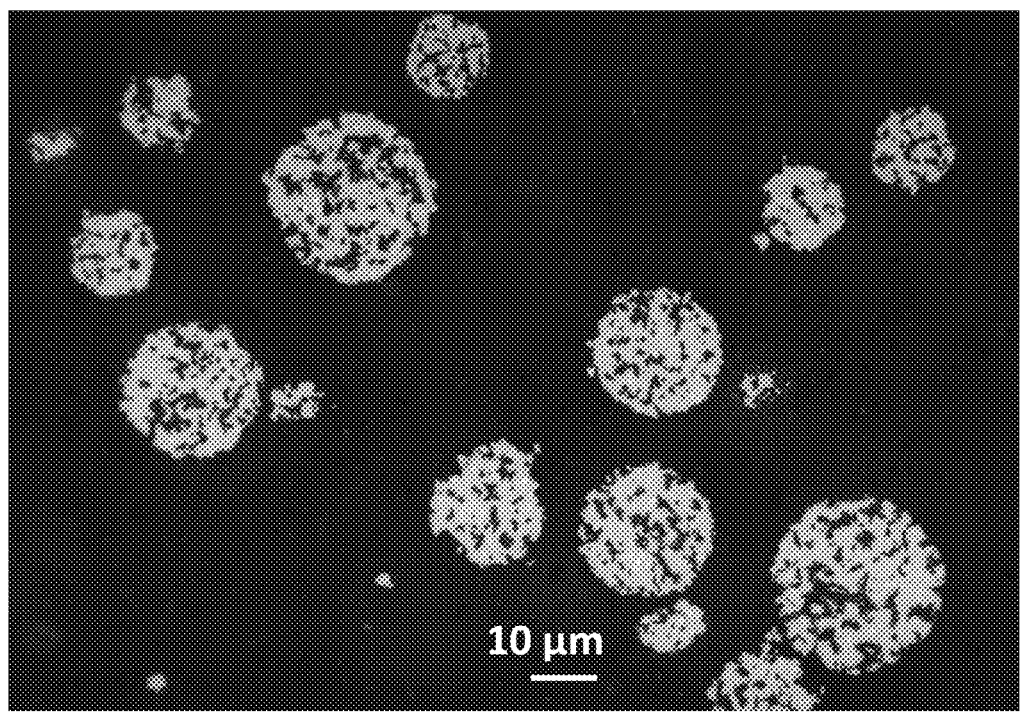
FIG. 4. A LOM image of a through cut of pre sintered particles of powder B4.

The porosity of the particles was analyzed by studying a through-cut of several particles. Particles were embedded in bakelite and polished and an image analysis was made using ImageJ at 1000× magnification. An example, powder B4, is shown in FIG. 4.

The powder of porous cemented carbide particles was then milled in a 30 liter ball mill for 4 hours. 50-100 kg cemented carbide cylpebs were used. In this milling step a relatively high fraction of particles which are <10 µm in diameter was formed. The amount of small fraction can for example be adjusted by tuning in the milling time.

The particle size distribution (D10, D50 and D90) and the fraction of the particles with a diameter<10 μm were analyzed with Sympatec HELOS/BR Particle size analysis with laser diffraction and RHODOS dry dispersing system. The results are presented in Table 1.

The Co content and the Cr content were studied in ICP-MS or XRF. The results are presented in Table 1. The cemented carbide powders also comprise WC in the amount adding up to 100% from the Co and Cr values in the Table 1.

TABLE 1

Powders

| Powder | Co (wt %) | Cr (wt %) | D10 (μm) | D50 (μm) | D90 (μm) | Vol % <10 μm (vol %) | Powder porosity (vol %) |
|---|---|---|---|---|---|---|---|
| A1 | 12.79 | 0.58 | 2.2 | 13 | 29 | 41 | 15 |
| A2 | 12.79 | 0.58 | 3.2 | 14 | 25.5 | 32 | 15 |
| A3 | 12.79 | 0.58 | 5.5 | 20 | 35 | 20 | 15 |
| A4 | 12.59 | 0.57 | 2.0 | 11.3 | 23 | 44.5 | 20 |
| B1 | 9.76 | 0.44 | 1.5 | 7.6 | 17 | 65 | 19 |
| B2 | 9.76 | 0.44 | 2.2 | 11 | 24 | 43 | 19 |
| B3 | 9.76 | 0.44 | 2.2 | 12 | 24.5 | 41 | 19 |
| B4 | 9.76 | 0.44 | 1.6 | 10.3 | 22.4 | 49 | 22 |

Printing was performed in a binder jetting printing machine with a layer thickness during printing of 100 μm. "ExOne X1-lab" was used for samples A1S, A2S, A3S, A1SSH, A2SSH, A3SSH, B1SSH, B2SSH, B1S, B2S and "ExOne Innovent" for samples B3S, A4SH, B3SSH, B4SH. Saturation during printing was between 90-97%. The saturation of printing binder is defined as the percent of the void volume that is filled with printing binder at a specified powder packing density (here the powder packing density is set to 60%). A higher saturation is needed when printing with a powder comprising a larger fraction of porous particles as compared to a lower fraction of porous particles. Water based printing ink X1-Lab™ Aqueous Binder (7110001CL) was used as printing binder. During the printing the sequence for each layer was as follows: a 100 μm layer of the powder was spread over the bed, printing binder was spread in a pattern as defined in a CAD model, followed by drying of the printing binder to remove the solvent of the printing binder. This was repeated until the full height of the green body was printed. Thereafter curing was done for 8 hours at 195° C. in argon atmosphere. Depowdering was done manually using a small brush and pressurized air.

The printed and cured green bodies were subsequently sintered to provide sintered cemented carbide samples (bodies). The sintering was done at Y-coated graphite trays in a DMK80 sintering furnace. In a first sintering process the bodies were subjected to a debinding step where the temperature was increased from room temperature up to 550° C. in a sintering chamber with a $H_2$ flow of 500 l/hour. This was followed by a vacuum step where the temperature was increased from 550° C. to 1380° C. where it was hold for 30 minutes. Thereafter the temperature was increased to 1410° C. where it was hold for one hour. Thereafter the chamber was cooled down and the sintered samples removed from the chamber. Samples treated with this process are named *S, for example A1S. The results are presented in Table 2.

Some of the sintered samples were then subjected to a sinter-HIP process including a step of holding the temperature at 1410° C. for 1 hour followed by a pressurized step where Ar was introduced into the chamber during approximately 13 minutes to reach the pressure 55 bar, and thereafter holding this pressure for 15 minutes. The chamber was thereafter cooled down and the sintered and sinter-HIP processed samples removed from the chamber. Samples treated with this process are named *SSH, for example A1SSH. The results are presented in Table 3.

In an alternative process samples were sintered and sinter-HIP processed in one single process, i.e directly after two hours in 1410° C. an increase in pressure to 55 bar was applied and this increased pressure was hold for 15 minutes. Samples treated with this process are named *SH, for example A4SH. The results are presented in Table 3.

The linear shrinkage of each sample was about 25-30% from green body to the sintered and/or sinter-HIP processed body (sample). A cross section of each sintered and sinter-HIP processed sample was studied. Porosity was investigated both by cemented carbide ABC-classification according to ISO4505-1978 and image analysis with ImageJ.

TABLE 2

Sintered samples

| Sample | Powder | Sintering temperature (° C.) | Density (g/cm$^3$) | Sample porosity (vol %) |
|---|---|---|---|---|
| A1S | A1 | 1410 | 13.86 | 3-4 |
| A2S | A2 | 1410 | 13.73 | 4-5 |
| A3S | A3 | 1410 | 13.37 | 8 |
| B1S | B1 | 1410 | 13.92 | 8-9 |
| B2S | B2 | 1410 | 13.42 | 13 |
| B3S | B3 | 1410 | 13.67 | 11 |

TABLE 3

Samples treated by sinter-HIP process

| Sample | Powder | Sintering cycle | Density (g/cm$^3$) | Porosity classification |
|---|---|---|---|---|
| A1SSH | A1 | 1410° C. at 55 bar | 14.18 | A00B00C00 |
| A2SSH | A2 | 1410° C. at 55 bar | 14.15 | A02B00C00 |
| A3SSH | A3 | 1410° C. at 55 bar | 14.11 | A02B02C00 |
| A4SH | A4 | 1410° C. at 55 bar | 14.31 | A00B00C00 |
| B1SSH | B1 | 1410° C. at 55 bar | 14.42 | A00B00C00 |
| B2SSH | B2 | 1410° C. at 55 bar | 14.51 | A02B00C00 |
| B3SSH | B3 | 1410° C. at 55 bar | 14.47 | A02B00C00 |
| B4SH | B4 | 1410° C. at 55 bar | 14.57 | A02B00C00 |

Samples A1SSH, A4SH and B1SSH was classified A00B00C00. As can be noticed from the examples both the porosity and the amount of <10 μm particles is important to achieve a dense and pore free 3D printed cemented carbide.

The binder phase content did vary periodically in the 3D printed bodies. This was studied in detail with EDS and WDS line scans with a JEOL JXA-8530F microprobe. The lines were measured perpendicular to the direction of the printed layers. The instrument settings and WDS crystals used for each analyzed element can be seen in Table 4 and 5.

TABLE 4

EPMA setting for line analysis

| Line length | 1400 μm |
| Line width | 200 μm |
| Acceleration voltage | 15 keV |
| Probe current | 50 nA |

TABLE 4-continued

| EPMA setting for line analysis | |
|---|---|
| Dwell time | 500 ms |
| Step width | 3.5 μm |
| Scan type | Stage scan |

TABLE 5

| Measured elements and WDS-crystals used | |
|---|---|
| Element | Crystal |
| W | PETJ |
| Co | LIFH |
| C | LDE6H |
| Cr | LIFH |

Figure 1:
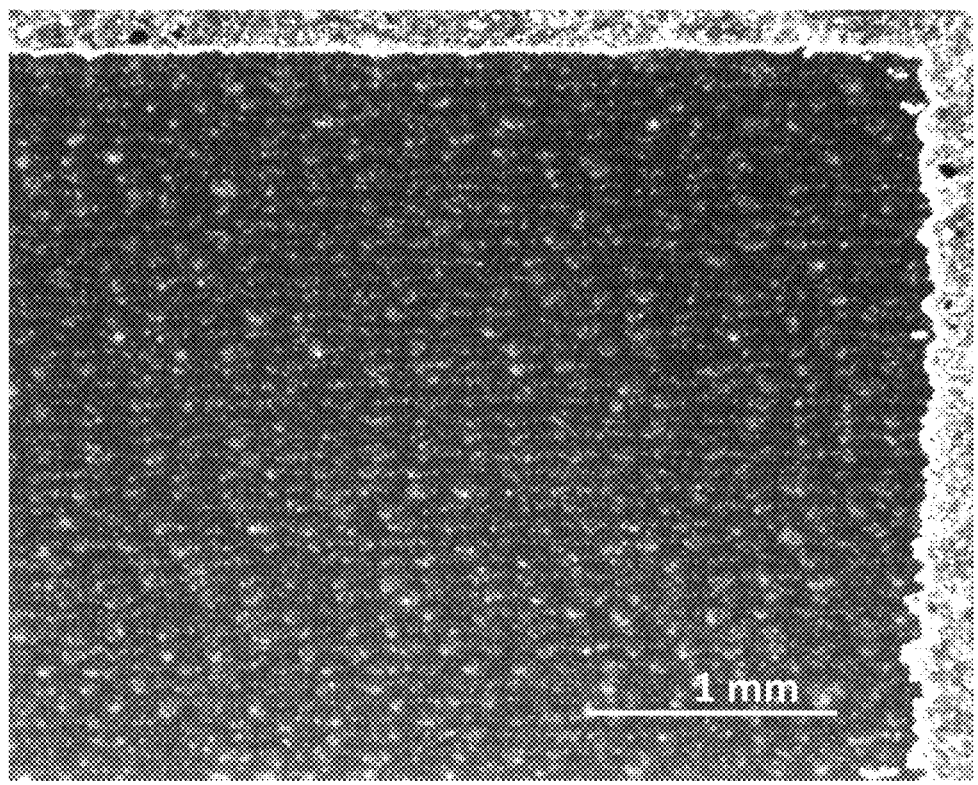
FIG. 1. A LOM (light optical microscope) image of a cross section of sample B4SH. The periodicity is visible as horizontal lighter and darker layers.
Figure 2:
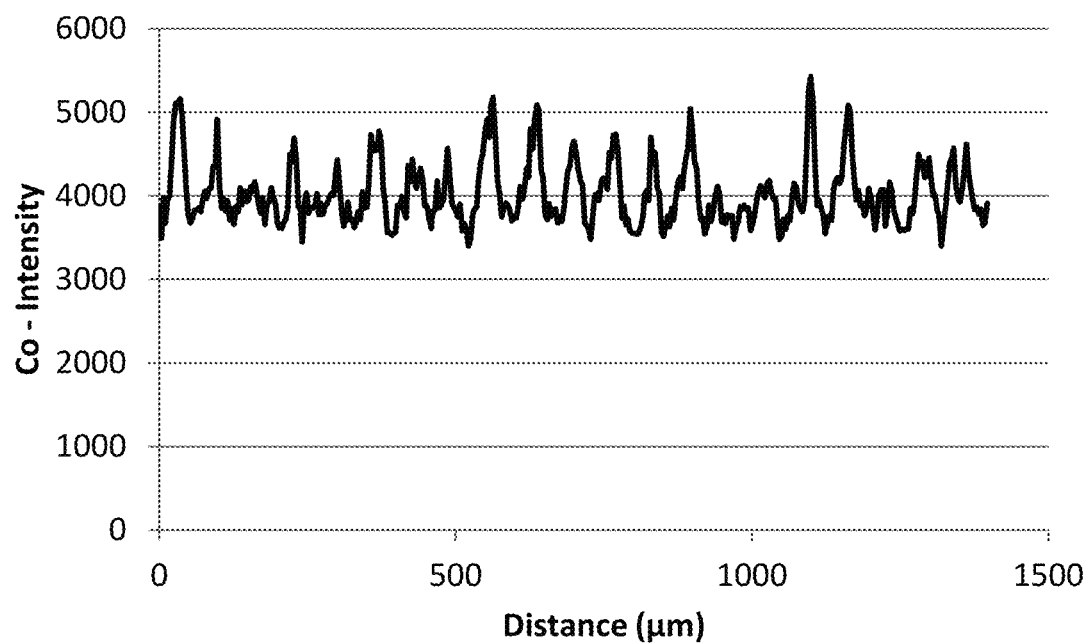
FIG. 2. A plot of the intensity of Co in relation to depth into the body for sample A2SSH as measured by WDS in a micro probe analysis. The measurement is made as disclosed in the example below and perpendicular to the printed layers.
Figure 5:
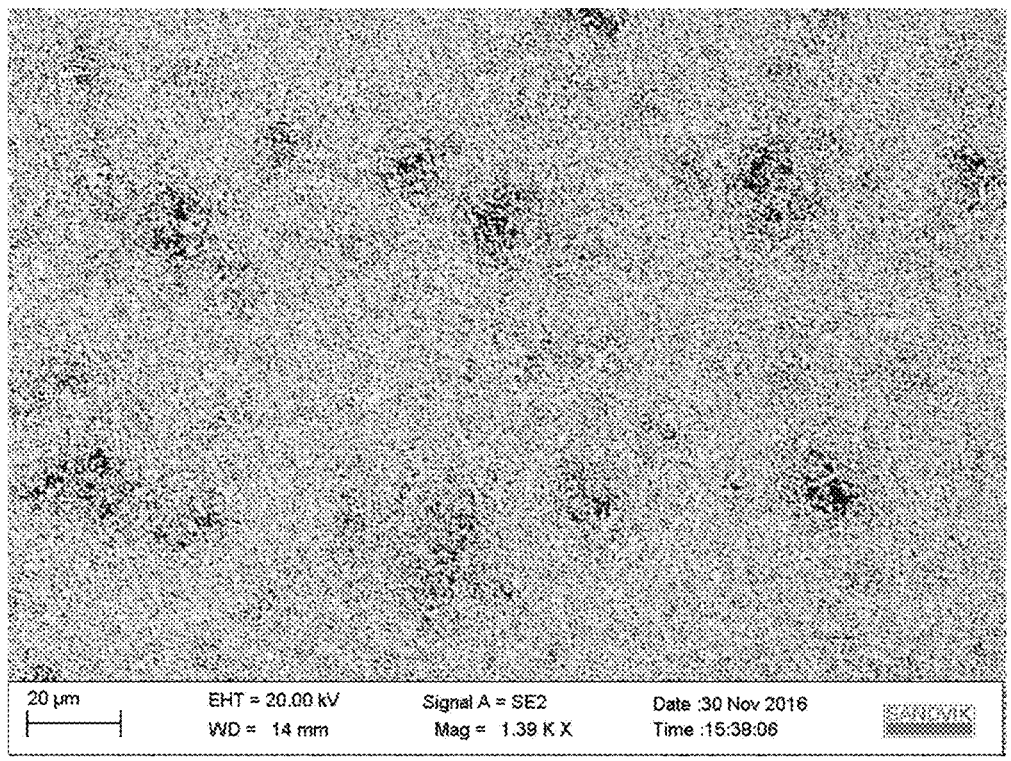
FIG. 5. An SEM (scanning electron microscope) image of a cross section of sample A1S.

An example of a typical Co variation is shown in FIG. 1 (sample B4S) and FIG. 2 (sample A2SSH). The average binder phase content, as an average of 15 adjacent periods, showed a difference of 17%, 17% and 16% from the average binder phase content in the body for samples A1SSH, A2SSH and B2SSH, respectively. FIG. 5 shows a through cut of the sample A1S.

While the invention has been described in connection with the various exemplary embodiments, it is to be understood that the invention is not limited to the disclosed exemplary embodiments; on the contrary, it is intended to cover various modifications and equivalent arrangements within the scope of the appended claims.

The invention claimed is:

1. A method of making a 3D printed cermet or cemented carbide body, said method comprising the steps of:
    mixing a cermet or cemented carbide raw powder and organic binder;
    spray drying said raw powder and thereby forming a granulated raw powder;
    pre-sintering said spray dried raw powder, removing said organic binder and thereby forming a pre-sintered granulated powder with an average porosity of the cermet and/or cemented carbide particles with a diameter of ≥20 μm is 10-40 vol %;
    milling said pre-sintered granulated powder until 30-70 vol % of the cermet and/or cemented carbide particles are <10 μm in diameter to thereby form a powder;
    3D printing a body using said powder together with a printing binder to thereby form a 3D printed cermet or cemented carbide green body; and
    sintering said green body to form a 3D printed cermet or cemented carbide body.

2. The method in accordance with claim 1, further comprising, subsequent to 3D printing and before sintering, the steps of:
    curing the 3D printed body in inert atmosphere at 150-230° C.; and
    depowdering the 3D printed body to remove loose particles from surfaces of the body.

3. The method in accordance with claim 1, wherein the sintering step includes a debinding step, where printing binder is burned off.

4. The method in accordance with claim 1, wherein the spray dried powder is sieved before the pre-sintering to remove particles larger than 42 μm in diameter.

5. The method in accordance with claim 1, wherein subsequent to or integrated in the sintering step, further comprising a step of sinter-HIP processing the cermet or cemented carbide body.

6. The method in accordance with claim 1, wherein the three-dimensional printing is a binder jetting.

7. The method in accordance with claim 1, wherein the body is a cutting tool for metal cutting or a cutting tool for mining application or a wear part.

* * * * *